US012194511B2

(12) United States Patent
Kim et al.

(10) Patent No.: US 12,194,511 B2
(45) Date of Patent: Jan. 14, 2025

(54) CLIMBING ROBOT PLATFORM

(71) Applicants: SEOUL NATIONAL UNIVERSITY R&DB FOUNDATION, Seoul (KR); IUCF-HYU (Industry-University Cooperation Foundation Hanyang University), Seoul (KR); KYONGGI UNIVERSITY INDUSTRY & ACADEMIA COOPERATION FOUNDATION, Suwon-si (KR)

(72) Inventors: Jongwon Kim, Seongnam-si (KR); Sungkeun Yoo, Seoul (KR); Jooyoung Hong, Seoul (KR); Taewon Seo, Seoul (KR); Hwa Soo Kim, Yongin-si (KR); Myoungjae Seo, Incheon (KR); Joohyun Oh, Seoul (KR); Jiseok Lee, Jeonju-si (KR); Garam Park, Pyeongtaek-si (KR); Youngjoo Lee, Gwangmyeong-si (KR); Dupyo Yoon, Seoul (KR); Hobyeong Chae, Seoul (KR)

(73) Assignees: Seoul National University R&D8 Foundation, Seoul (KR); IUCF-HYU (Industry-University Cooperation Foundation Hanyang University), Seoul (KR); Kyonggi University Industry & Academia Cooperation Foundation, Gyeonggi-Do (KR)

(*) Notice: Subject to any disclaimer, the term of this patent is extended or adjusted under 35 U.S.C. 154(b) by 791 days.

(21) Appl. No.: 17/389,129

(22) Filed: Jul. 29, 2021

(65) Prior Publication Data

US 2022/0120377 A1    Apr. 21, 2022

(30) Foreign Application Priority Data

Jun. 1, 2020    (KR) .................. 10-2020-0065996

(51) Int. Cl.
*B66D 1/74* (2006.01)
*B08B 3/02* (2006.01)
(Continued)

(52) U.S. Cl.
CPC ............. *B08B 3/024* (2013.01); *B25J 9/0009* (2013.01); *B25J 9/104* (2013.01); *B62D 57/04* (2013.01);
(Continued)

(58) Field of Classification Search
CPC ......... B08B 3/024; B25J 9/0009; B25J 9/104; B25J 11/0085; B25J 19/005; B62D 57/04;
(Continued)

(56) References Cited

U.S. PATENT DOCUMENTS 3,080,592 A * 3/1963 Hassage .................... A47L 1/02
                                                              15/250.4
3,863,393 A * 2/1975 Goff ........................ B24C 3/062
                                                               212/346
(Continued)

FOREIGN PATENT DOCUMENTS

JP      06-055976 U    8/1994
JP      H07-079885 A   3/1995
(Continued)

*Primary Examiner* — Sang K Kim
*Assistant Examiner* — Nathaniel L Adams
(74) *Attorney, Agent, or Firm* — Fenwick & West LLP

(57) ABSTRACT

The present disclosure relates to a climbing robot platform. The climbing robot platform is a climbing robot platform of a building facade cleaning robot, and includes a body, a lifting device installed in the body, moving up by winding a rope and moving down by unwinding the rope, and a feeding device installed in the body to feed the rope by adjusting a feed point of the rope.

12 Claims, 15 Drawing Sheets

(51) Int. Cl.
   *B25J 9/00*     (2006.01)
   *B25J 9/10*     (2006.01)
   *B62D 57/04*    (2006.01)
   *F16M 13/02*    (2006.01)

(52) U.S. Cl.
   CPC ......... *F16M 13/022* (2013.01); *B66D 1/7489* (2013.01)

(58) Field of Classification Search
   CPC ... F16M 13/022; E04G 23/002; B66D 1/7489
   See application file for complete search history.

(56) References Cited

U.S. PATENT DOCUMENTS

| | | | | |
|---|---|---|---|---|
| 5,465,446 | A * | 11/1995 | Chang | A47L 1/02 |
| | | | | 15/103 |
| RE36,649 | E * | 4/2000 | Jefferies | A47L 1/02 |
| | | | | 15/103 |
| 7,665,173 | B2 * | 2/2010 | Simonette | E04G 23/002 |
| | | | | 15/103 |
| 7,753,344 | B1 * | 7/2010 | Moretz | E21B 19/22 |
| | | | | 254/331 |
| 9,681,784 | B2 * | 6/2017 | Lange | A47L 1/02 |
| 9,689,170 | B1 * | 6/2017 | Lange | E04G 23/002 |
| 2010/0130108 | A1 * | 5/2010 | Mann | E04G 3/30 |
| | | | | 451/75 |

FOREIGN PATENT DOCUMENTS

| | | |
|---|---|---|
| KR | 10-2013-0084438 A | 7/2013 |
| KR | 10-2017-0137517 A | 12/2017 |
| KR | 10-2100275 B1 | 4/2020 |

\* cited by examiner $$\tau_1 = \tau_2 = \tau_3 = \tau_4$$

CLIMBING ROBOT PLATFORM

CROSS-REFERENCE TO RELATED APPLICATION

This application claims priority from Republic of Korea Patent Application No. 10-2020-0065996, filed on Jun. 1, 2020, and all the benefits accruing therefrom under 35 U.S.C. § 119, the contents of which are herein incorporated by reference in their entirety.

TECHNICAL FIELD

The present disclosure relates to a climbing robot platform, and more particularly, to a climbing robot platform for climbing building facades on rope to clean the building facades.

DESCRIPTION ABOUT NATIONAL RESEARCH AND DEVELOPMENT SUPPORT

This study was supported by the Ministry of Science and ICT, Republic of Korea (Project Name: Research on mobile and environment adaptive robot mechanism technology for high-rise building facades, Project No. 1711117248) under the superintendence of National Research Foundation of Korea.

BACKGROUND ART

Building facades are contaminated with meteorological phenomena such as storm and snow and fine dust. To clean the contaminated building facades, human workers have cleaned the building facades while moving along the building facades using ropes.

However, accidents such as falls may occur while workers are cleaning facades in high-rise buildings, so climbing robots for cleaning building facades (hereinafter referred to as cleaning robots) are being studied.

The cleaning robot may include a building climbing robot platform (hereinafter referred to as a climbing robot platform), and a cleaning module installed in the climbing robot platform to perform a cleaning operation. The cleaning robot replaces human workers, and this reduces the risk of worker injury, but since the cleaning module of the cleaning robot (hereinafter referred to as the cleaning module) has the limited movement, it is difficult to effectively clean the building facades having various shapes.

To solve this problem, cleaning robots configured to adjust the angles and forces of contact between the cleaning module and the building facades have been developed. For example, Korean Patent Publication No. 10-2013-0084438 discloses a cleaning device of which the location of its center of mass is changed using a hoist motor as a weight to vary the contact strength of a front wheel or a rear wheel with the building facade.

However, Korean Patent Publication No. 10-2013-0084438 changes the location of the center of weight by moving the hoist motor having a limited weight within the limited range, which makes it difficult to bring the cleaning robot including the cleaning module having various sizes and weights into contact in parallel to building facades.

Technical Problem

An object of the present disclosure is to solve the problem that a cleaning module installed in a climbing robot platform fails to come into contact in parallel to building facade.

Another object of the present disclosure is to solve the problem that it is not easy to attach a rope to a climbing robot platform.

Another object of the present disclosure is to solve the problem that a climbing robot platform cannot easily go over an obstacle.

Another object of the present disclosure is to solve the problem that lifting pulleys are rotated by different torques, causing damage to a rope wound on the lifting pulleys.

Another object of the present disclosure is to solve the problem that it is impossible to safely place a cleaning robot back when the power supply to a climbing robot platform is stopped.

The object of the present disclosure is not limited to the above-mentioned objects, and other objects not mentioned herein will be clearly understood by those skilled in the art from the following description.

Technical Solution

To solve the above-described problem, a climbing robot platform according to an embodiment of the present disclosure is a climbing robot platform of a building facade cleaning robot, and includes a body including a motor, a lifting device installed in the body, moving up by winding a rope and moving down by unwinding the rope, and a feeding device installed in the body to feed the rope by adjusting a feed point of the rope.

Additionally, the feeding device may include a first guide member to feed the rope, a second guide member rotatably connected to the first guide member to guide the rope, and a location adjusting member rotatably connected to each of the first guide member and the second guide member and capable of adjusting a length.

Additionally, the feeding device may include an opening/closing member to open/close the feed point.

Additionally, the first guide member may include a first roller at the feed point, the opening/closing member may include a third roller rotatably coupled to the first guide member, and when the opening/closing member closes the feed point, the rope may be pressed by the first roller and the third roller.

Additionally, the climbing robot platform may include a tilting device installed in the body and capable of tilting, and a propulsion device installed in the tilting device to be independently tilted, and including a propeller to generate a propulsive force.

Additionally, the lifting device may include at least two lifting pulleys to wind or unwind the rope by a torque of the lift motor, and each lifting pulley may be connected with a differential gear device which distributes the torque transmitted from the lift motor.

Additionally, the lifting device may be attachable/detachable to/from the body.

Additionally, the climbing robot platform may include a pulley guide member to guide movement of the rope wound on the lifting pulleys, and a press member to press the rope wound on the lifting pulleys.

Additionally, the climbing robot platform may include a location measuring device to measure a location of the body.

Additionally, the climbing robot platform may include an auxiliary power supply device including a battery capable of charging and supplying power.

To solve the above-described problem, a climbing robot platform according to another embodiment of the present disclosure is a climbing robot platform of a building facade cleaning robot, and includes a body including a motor, a lifting device installed in the body, moving up by winding a rope and moving down by unwinding the rope, a feeding device installed in the body to feed the rope by adjusting a feed point of the rope, and a supply device including a power supply unit to supply power and a water supply unit to supply water.

Additionally, the power supply unit may include a power cable rotatably connected to a rear side of the body on the basis of an ascending direction of the cleaning robot, and the water supply unit may include a water cable rotatably connected to the rear side of the body on the basis of the ascending direction of the cleaning robot.

Additionally, the climbing robot platform may include a tilting device installed in the body and capable of tilting, and a propulsion device installed in the tilting device to be independently tilted, and including a propeller to generate a propulsive force.

Additionally, the climbing robot platform may include a location measuring device to measure a location of the body.

Additionally, the climbing robot platform may include an auxiliary power supply device including a battery capable of charging and supplying power.

The details of other embodiments for solving the problem are included in the description of the present disclosure and the accompanying drawings.

Advantageous Effects

In the climbing robot platform according to the present disclosure, the feeding device adjusts the location of the rope feed point, leading to a change in the relative position of the center of mass and a point of action of tension of the cleaning robot and the consequential movement of the climbing robot platform, in order to bring the cleaning module into contact in parallel to the building facade.

Additionally, since the feeding device has the opening/closing member at the rope feed point and the lifting device is attachable/detachable to/from the body, it is possible to easily attach the rope to the climbing robot platform.

Additionally, since the movement of the climbing robot platform is controlled through the propulsion device which generates a propulsive force, the climbing robot platform can easily go over an obstacle.

Additionally, since the plurality of lifting pulleys is connected with the differential gear device, the lifting pulleys are supplied with the equal torque, thereby preventing damage to the rope wound on the lifting pulleys.

Additionally, with the auxiliary power supply device including the battery capable of charging and supplying power, it is possible to safely place the cleaning robot back using the power of the auxiliary power supply device when the power supply is stopped.

BEST MODE

Figure 1:
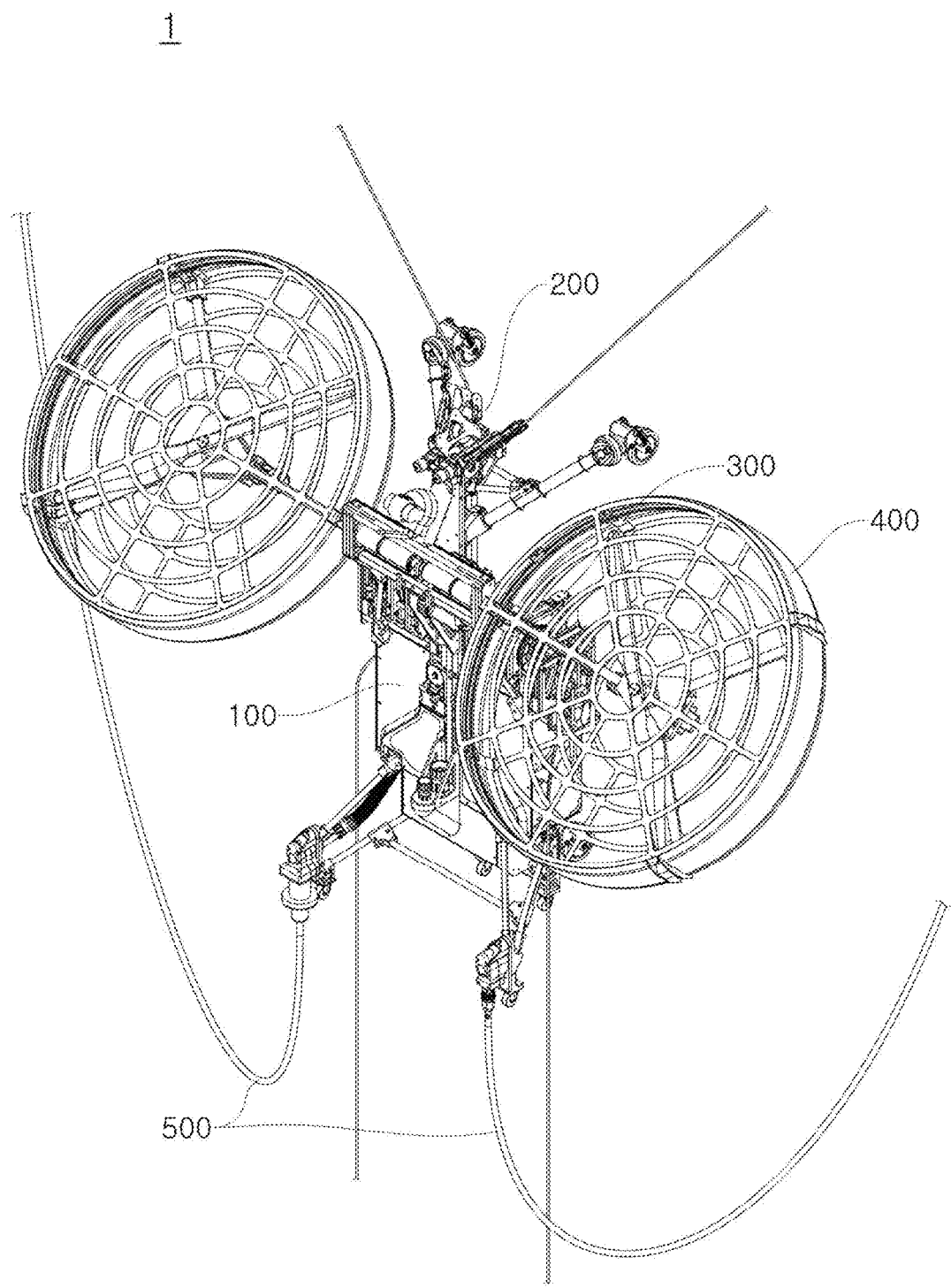
FIG. 1 is a diagram showing a climbing robot platform according to an embodiment of the present disclosure.

Hereinafter, the preferred embodiments of the present disclosure will be described in detail with reference to the accompanying drawings and the following description. However, the present disclosure is not limited to the disclosed embodiments and may be embodied in other forms. Rather, these embodiments are provided so that this disclosure will be thorough and complete, and will fully convey the spirit of the present disclosure to those skilled in the art. Like reference numerals indicate like elements throughout the specification. The terms as used herein are provided to describe the embodiments, but not intended to limit the present disclosure. Unless the context clearly indicates otherwise, the singular forms as used herein include the plural forms as well. The term "comprises" and/or "comprising" when used in this specification, specifies the presence of stated elements, steps, operations, members, components, materials and/or devices, but does not preclude the presence or addition of other elements, steps, operations, members, components, materials and/or devices.

Hereinafter, the configuration of a climbing robot platform 1 according to an embodiment of the present disclosure will be described.

FIG. 1 is a diagram showing the climbing robot platform according to an embodiment of the present disclosure.

As shown in FIG. 1, the climbing robot platform 1 according to an embodiment of the present disclosure may include a body 100, a feeding device 200, a lifting device 300, a steering device 400, a supply device 500 and an auxiliary power supply device.

To begin with, the configuration of the body 100 will be described.

The body 100 may be configured in which the components of the climbing robot platform 1 are installed, and may include a plurality of frames and plates. Additionally, the body 100 may include a motor.

Figure 2A:
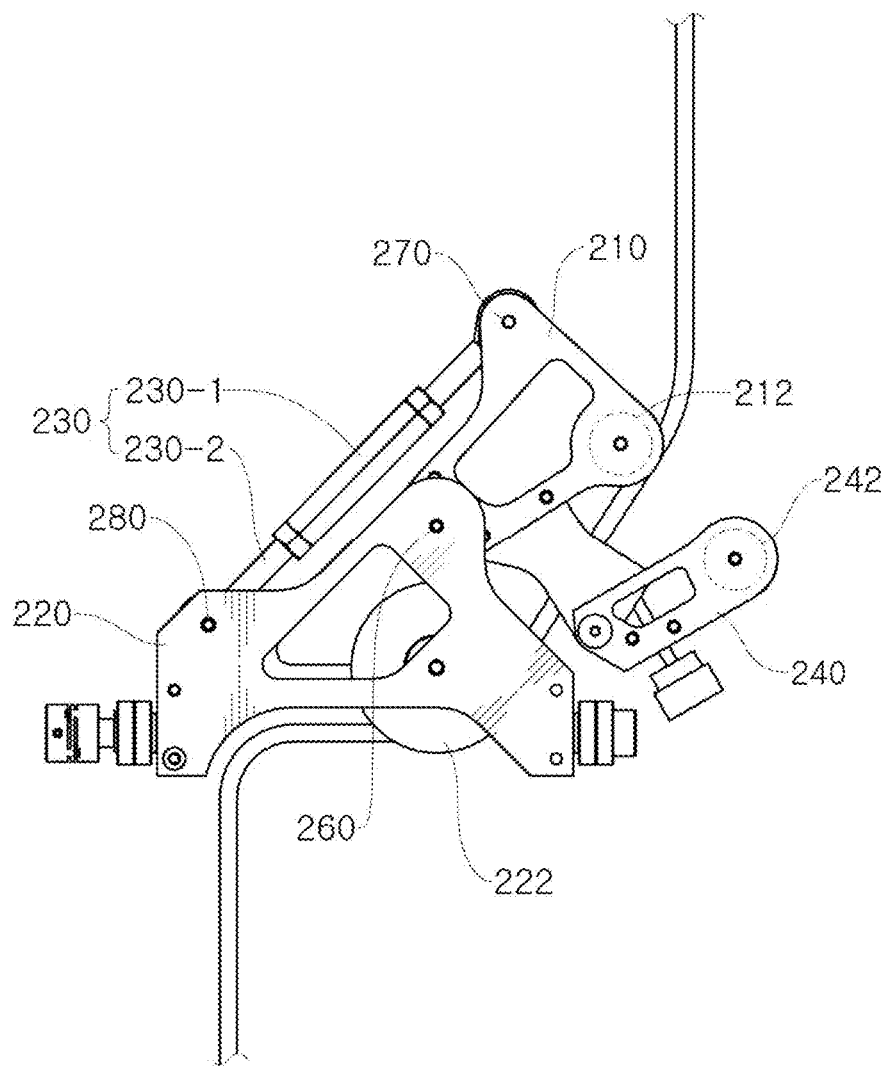
FIG. 2A is a diagram showing a feeding device of the climbing robot platform of FIG. 1 in an open state of an opening/closing member.
Figure 2B:
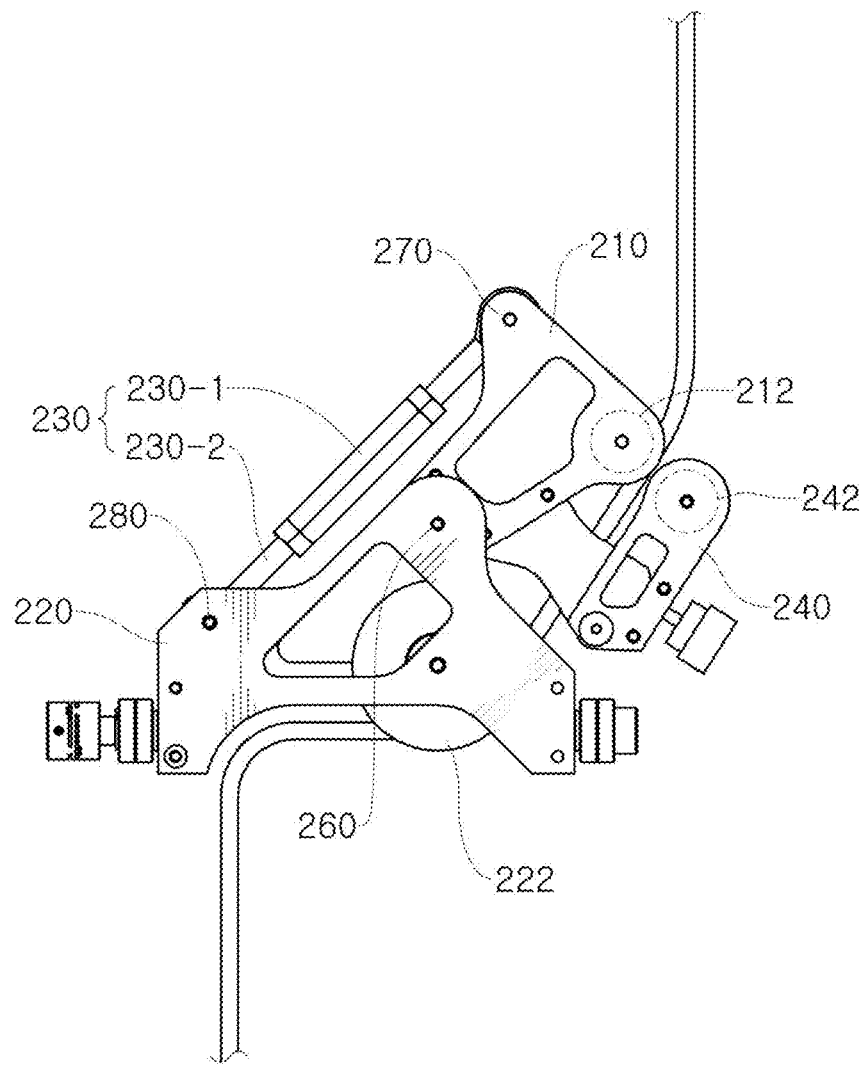
FIG. 2B is a diagram showing a feeding device of the climbing robot platform of FIG. 1 in a closed state of an opening/closing member.

FIG. 2A is a diagram showing the feeding device of the climbing robot platform of FIG. 1 in an open state of an opening/closing member, and FIG. 2B is a diagram showing the feeding device of the climbing robot platform of FIG. 1 in a closed state of the opening/closing member.

Subsequently, the configuration of the feeding device 200 will be described.

Two feeding devices 200 may be each provided to guide the feeding of a rope that is accommodated in the climbing robot platform 1 to make a climbing motion, and may include a first guide member 210, a second guide member 220, a location adjusting member 230, an opening/closing member 240 and a location measuring device.

As shown in FIG. 2A, the first guide member 210 may include a first roller 212 so that the rope is supported by the first roller 212 while being fed, and may be rotatably connected to the second guide member 220 around a first rotation axis 260.

The second guide member 220 may include a second roller 222, and may perform a function of guiding the rope fed through the first guide member 210.

The location adjusting member 230 may be configured to adjust the length, and one side of the location adjusting member 230 in the lengthwise direction may be rotatably connected to the first guide member 210 around a second rotation axis 270. Additionally, the other side of the location adjusting member 230 in the lengthwise direction may be rotatably connected to the second guide member 220 around a third rotation axis 280.

Meanwhile, the location adjusting member 230 may be an existing element for adjusting the length. Describing by taking as an example, the location adjusting member 230 may include an outer pipe 230-1 and an inner pipe 230-2 which is inserted into the outer pipe 230-1 from two sides.

The first rotation axis 260, the second rotation axis 270 and the third rotation axis 280 may be configured in parallel. Accordingly, by the length adjustment of the location adjusting member 230, the first guide member 210 may make a rotational motion with respect to the second guide member 220, resulting in a change in location of a point of action of tension (hereinafter referred to as a feed point) of the rope supported by the first roller 212.

The opening/closing member 240 may be configured to open/close the feed point. For example, describing with reference to FIGS. 2A and 2B, the opening/closing member 240 may include a third roller 242, and may be rotatably coupled to the first guide member 210 to open/close the feed point. Additionally, when the opening/closing member 240 closes the feed point by rotation, the third roller 242 may be configured to press the rope together with the first roller 212.

The location measuring device may be an existing location measuring device to measure the location of the climbing robot platform 1. Describing by taking an example, the location measuring device may include an angle encoder to measure the angle between a pair of ropes connected to the pair of feeding devices 200, a load cell to measure the tension of the rope, and a distance encoder to measure the winding distance of the rope. Additionally, the location of the climbing robot platform 1 may be measured based on the angle between the pair of ropes measured by the angle encoder, the tension of the rope and the winding distance of the rope.

Meanwhile, the cleaning module may be brought into close contact with the building facade by adjusting the feed point of the rope fed into the feeding device 200 using the location adjusting member 230.

Figure 3:
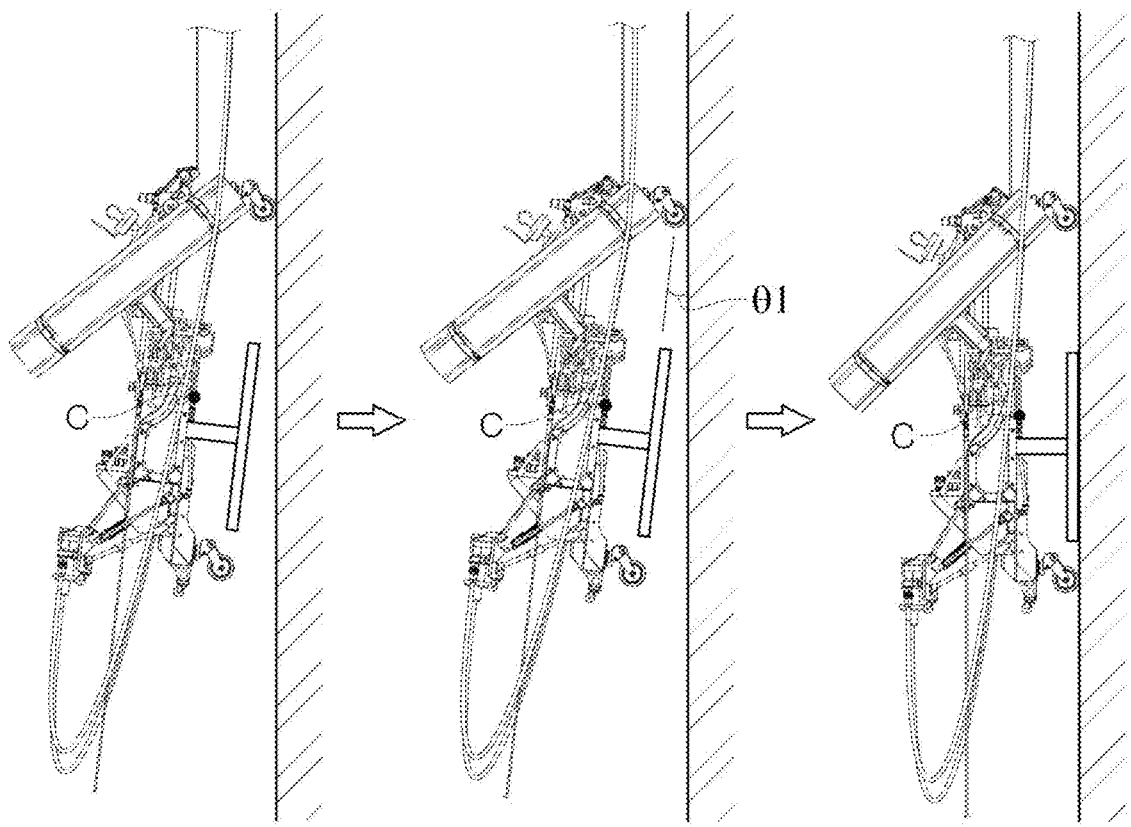
FIG. 3 is a diagram showing the operation of a climbing robot platform with a point of action of tension of a rope moving closer to a building facade.

FIG. 3 is a diagram showing the operation of the climbing robot platform with the point of action of tension of the rope moving closer to the building facade.

As shown in FIG. 3, when the cleaning module attached to the climbing robot platform 1 is kept in contact with the building facade at a first angle 81, the climbing robot platform 1 may be adjusted to bring the cleaning module into contact in parallel to the building facade.

Specifically, when the location adjusting member 230 is adjusted to place the feed point of the rope fed into the location adjusting member 230 close to the building facade, the feed point or the point of action of tension of the rope acting on the climbing robot platform 1 moves closer to the building facade. Accordingly, with a rotational motion of the center of mass C of the climbing robot platform 1 closer to the building under gravity, the cleaning module may come into contact with the building facade in parallel to the building facade.

Figure 4:
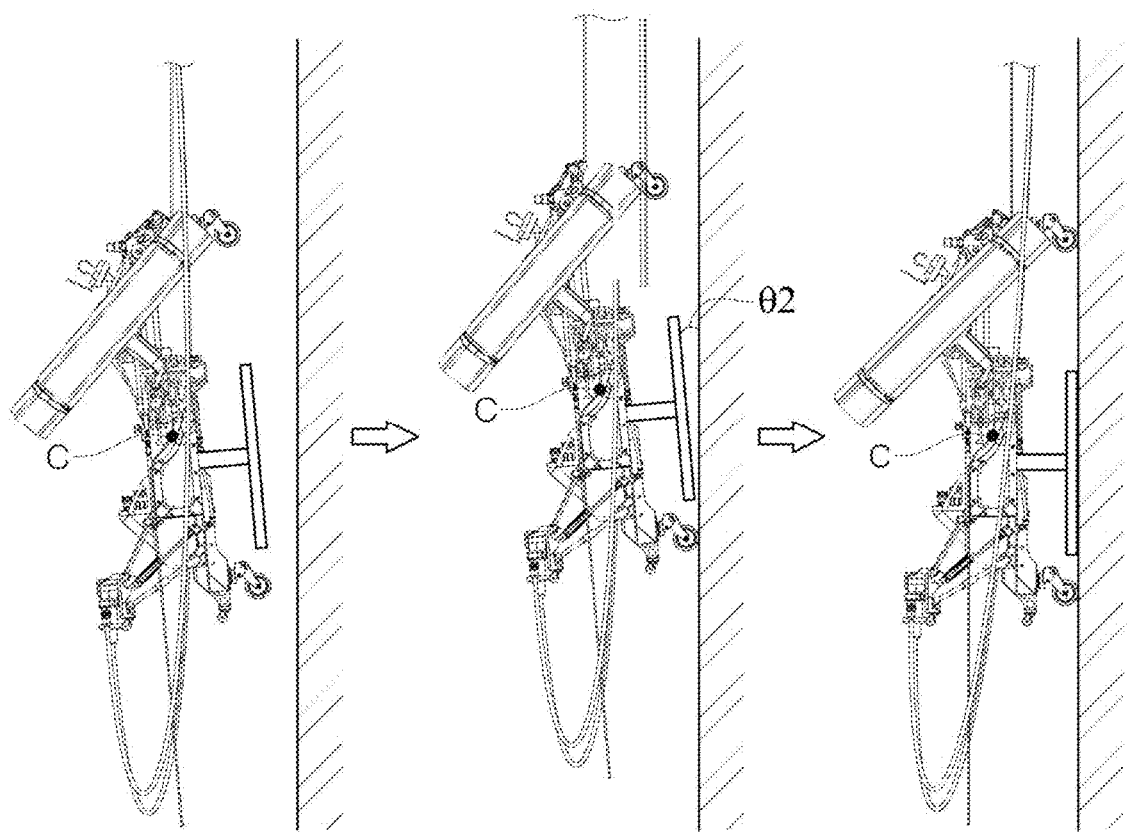
FIG. 4 is a diagram showing the operation of a climbing robot platform with a point of action of tension of a rope moving away from a building facade.

FIG. 4 is a diagram showing the operation of the climbing robot platform with the point of action of tension of the rope moving away from the building facade.

As shown in FIG. 4, when the cleaning module attached to the climbing robot platform 1 is kept in contact with the building facade at a second angle 82, the climbing robot platform 1 may be adjusted to bring the cleaning module into contact in parallel to the building facade.

Specifically, when the location adjusting member 230 is adjusted to place the feed point of the rope fed into the location adjusting member 230 away from the building facade, the feed point or the point of action of tension of the rope acting on the climbing robot platform 1 moves away from the building facade. Accordingly, with a rotational motion of the center of mass C of the climbing robot platform 1 away from the building under gravity, the cleaning module may come into contact with the building facade in parallel to the building facade.

Figure 5:
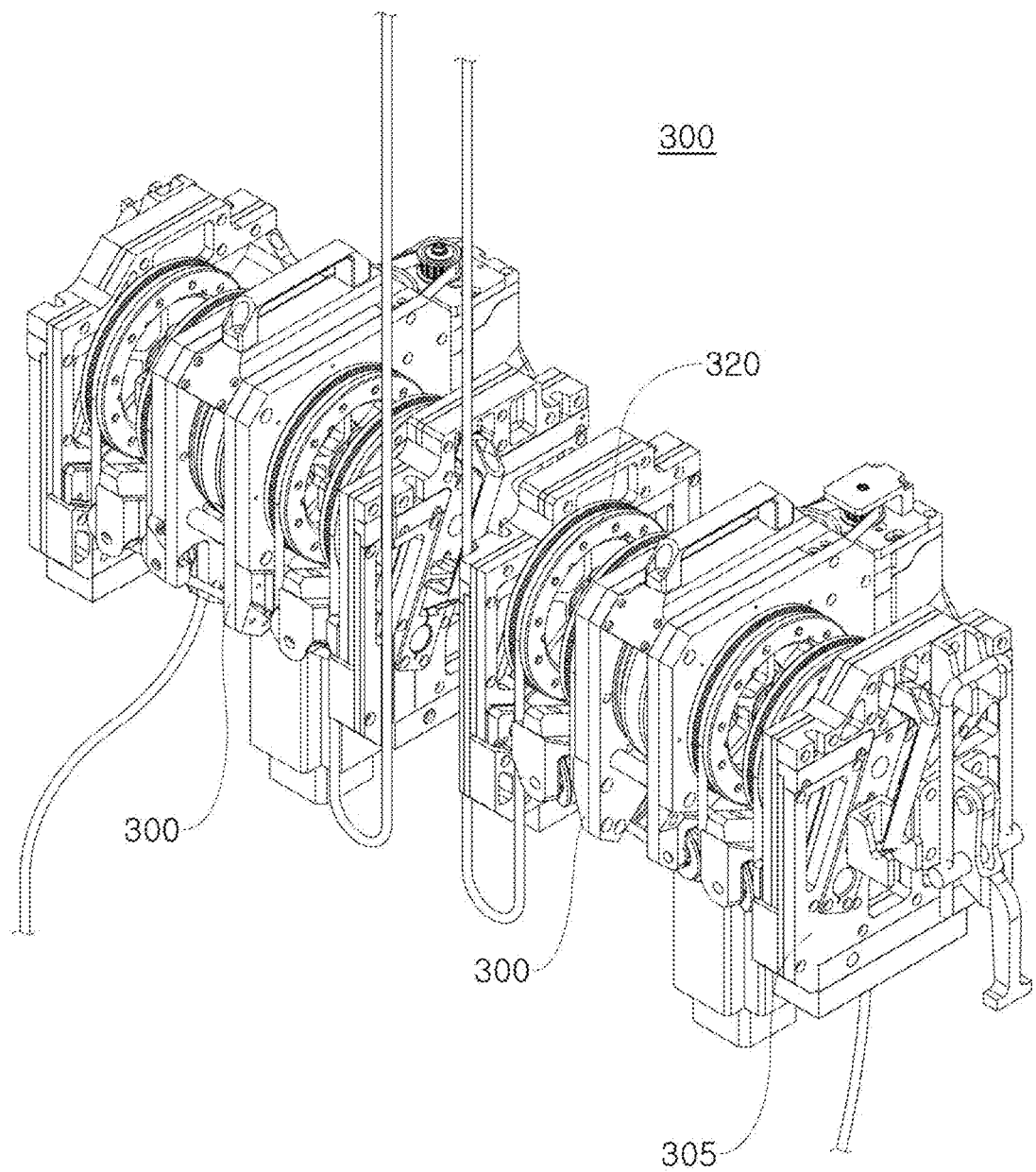
FIG. 5 is a diagram showing a lifting device of the climbing robot platform of FIG. 1.

FIG. 5 is a diagram showing the lifting device of the climbing robot platform of FIG. 1.

Subsequently, the configuration of the lifting device 300 will be described.

The lifting device 300 may perform a function of winding or unwinding the rope to move the climbing robot platform 1 up or down along the building facade. A plurality of lifting devices 300 corresponding to the number of ropes connected to the climbing robot platform 1 may be provided, and the lifting device 300 may include a frame 305, a rotary rod 310, a lifting pulley 320, a differential gear device 330, a pulley guide member 340 and a press member 350.

The frame 305 may form a framework of the lifting device 300, and may be a plate or board made of a rigid material.

The rotary rod 310 may be formed in the shape of a rod that extends in the lengthwise direction, and may be installed in the frame 305 to allow for rotatable coupling of the lifting pulley 320 and the differential gear device 330.

The lifting pulley 320 may be formed in the shape of a disc having a groove along the periphery, on which the rope fed into the lifting device 300 is wound, and a plurality of lifting pulleys 320 may be rotatably coupled to the rotary rod 310.

The differential gear device 330 may perform a function of connecting each lifting pulley 320 using the gear, and may be configured to equally transmit the torque of the motor provided in the body 100 to each lifting pulley 320.

For example, when the climbing robot platform 1 according to an embodiment of the present disclosure includes four lifting pulleys 320, the climbing robot platform 1 may include three differential gear devices 330 and each lifting pulley 320 may be connected with the differential gear devices 330.

Figure 6:
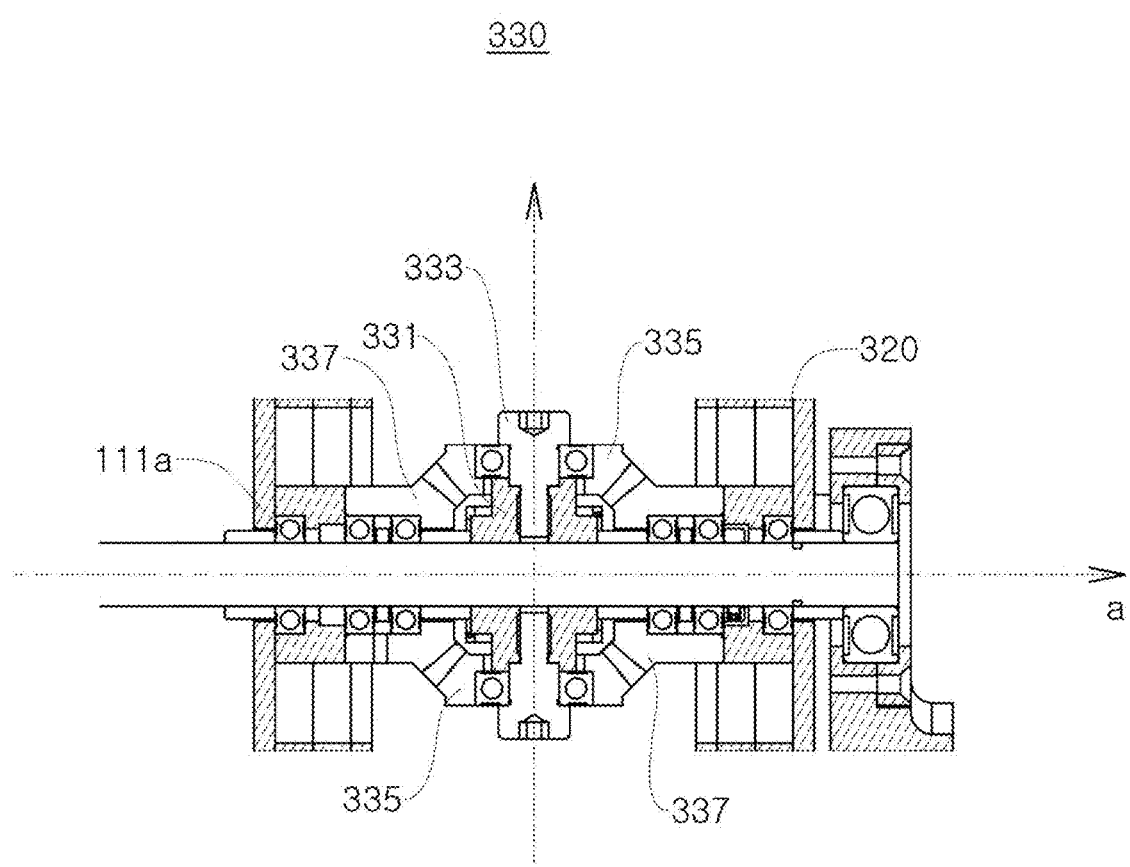
FIG. 6 is a cross-sectional view showing a differential gear device of the lifting device of FIG. 5.

FIG. 6 is a cross-sectional view showing the differential gear device of the lifting device of FIG. 5.

As shown in FIG. 6, the differential gear device 330 may include a fixed block 331 coupled to the rotary rod 310, a fixed axis 333 coupled to the fixed block 331, a first bevel gear 335 rotatably installed around the fixed axis 333, and two second bevel gears 337 rotatably installed around the rotary rod 310 and connected to the first bevel gear 335.

One or two fixed axes 333 and one or two first bevel gears 335 may be provided, and each second bevel gear 337 is coupled to the lifting pulley 320.

When the rotary rod 310 is rotated by the torque of the motor, the fixed block 331 and the fixed axis 333 rotate around the rotation axis, and the first bevel gear 335 installed at the fixed axis 333 also rotates (hereinafter referred to as revolves) around the rotation axis of the rotary rod 310. Additionally, each second bevel gear 337 connected to the first bevel gear 335 also rotates around the rotation axis of the rotary rod 310.

Meanwhile, when forces of each lifting pulley 320 acting on each second bevel gear 337 are equal, the first bevel gear 335 does not rotate (hereinafter referred to as pivot) around the fixed axis 333, and only revolves. However, when forces of each lifting pulley 320 acting on each second bevel gear 337 are different, the first bevel gear 335 pivots and revolves at the same time.

As described above, since the first bevel gear 335 can pivot and revolve, each second bevel gear 337 may rotate at each independent speed according to the forces of each lifting pulley 320 acting on each second bevel gear 337. Additionally, each lifting pulley 320 connected to each second bevel gear 337 rotates at each independent speed.

Figure 7:
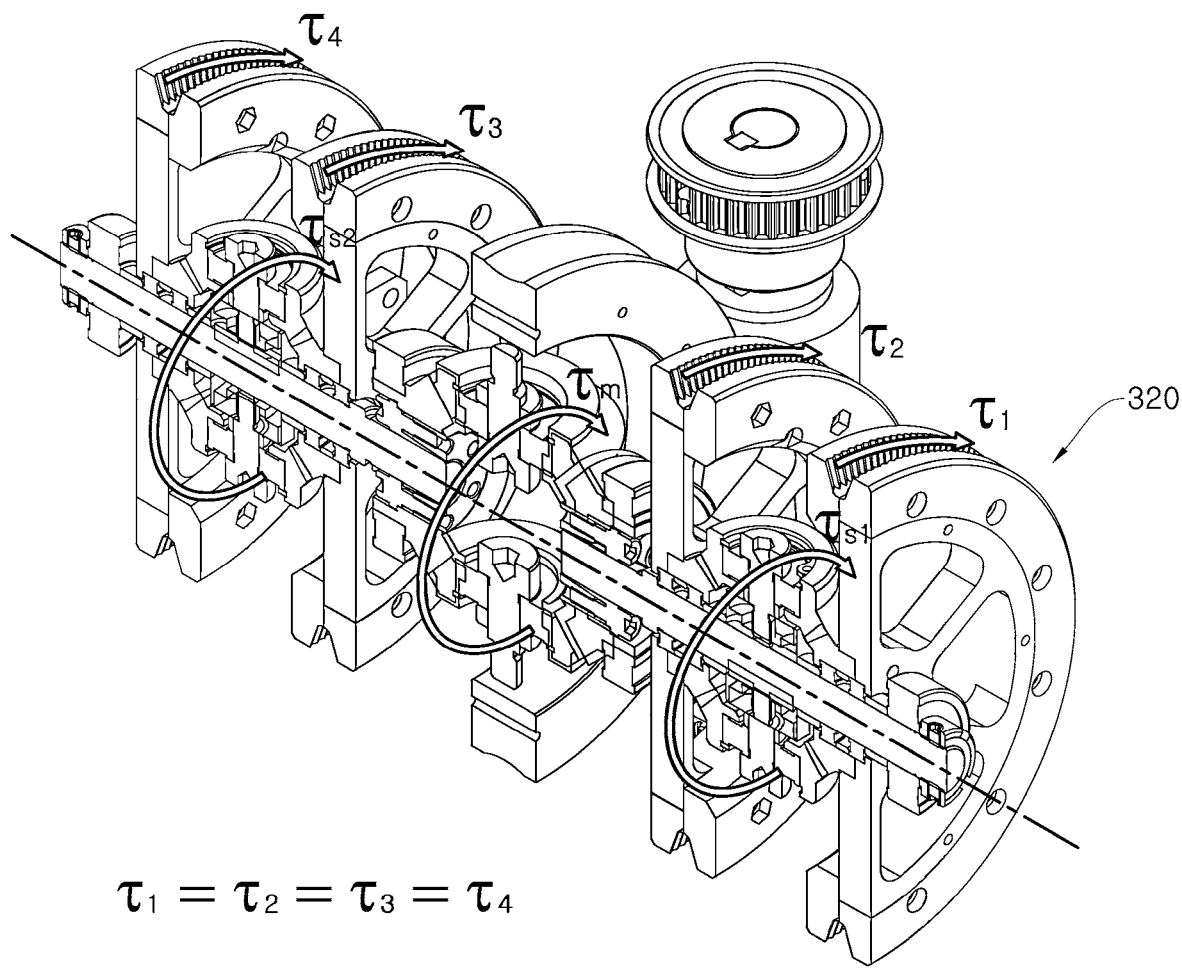
FIG. 7 is a diagram showing turning forces of lifting pulleys of the lifting device of FIG. 5.

FIG. 7 is a diagram showing the turning forces of the lifting pulleys of the lifting device of FIG. 5.

As shown in FIG. 7, each of the plurality of lifting pulleys 320 is connected with the differential gear device 330. Additionally, when the rotary rod 310 is rotated by the torque of the motor, the torque of the rotary rod 310 may be equally transmitted to each lifting pulley 320 by the differential gear device 330.

Accordingly, the rope may be wound on the plurality of lifting pulleys 320 with the equal force, and differences in the rotational speed of the lifting pulley 320 and the winding speed of the rope on the lifting pulley 320 may be minimized.

The pulley guide member 340 may perform a function of guiding the rope to stably wind the rope wound on the lifting pulley 320 on a groove in the lifting pulley 320.

Figure 8:
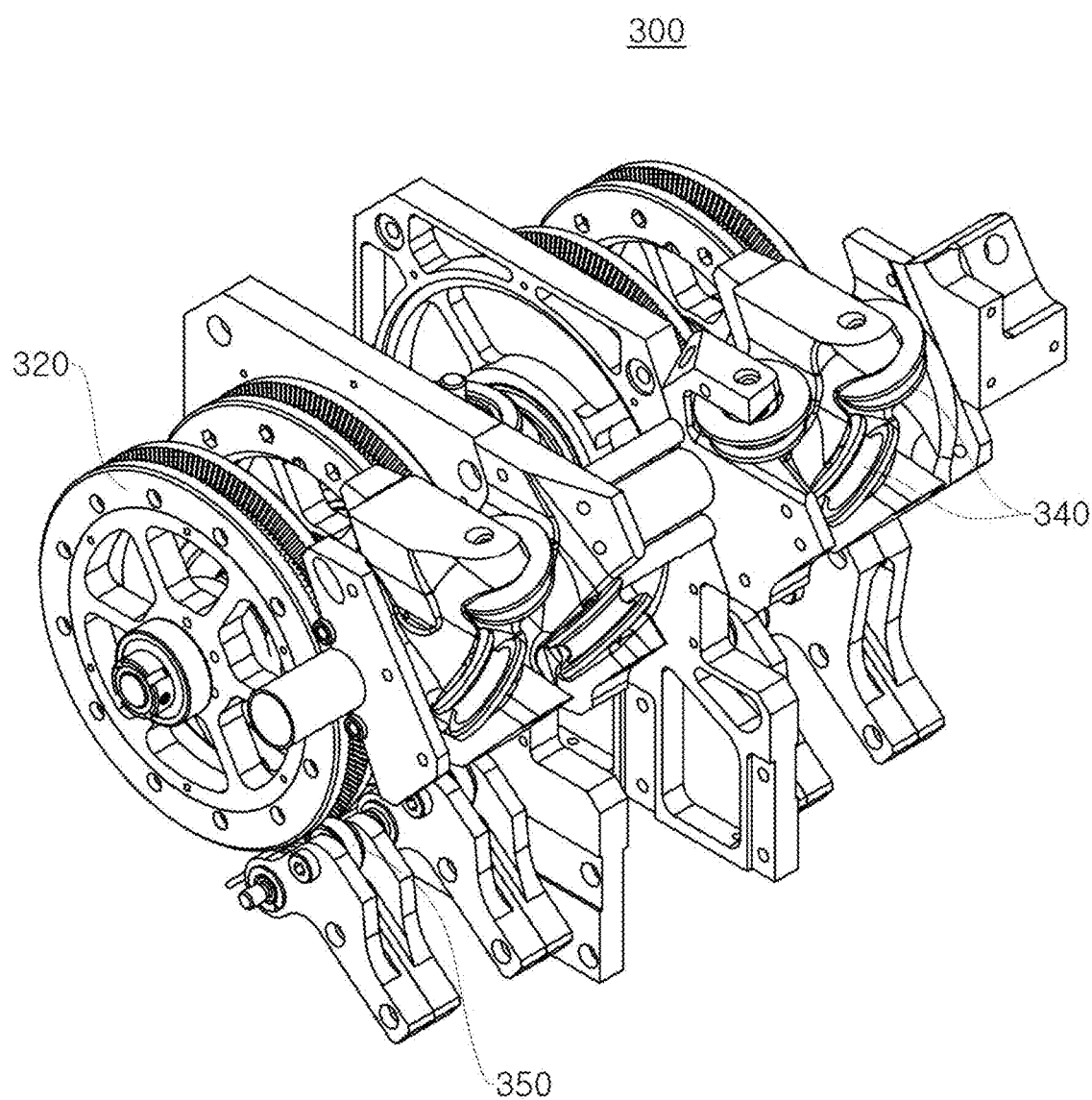
FIG. 8 is a diagram showing a pulley guide member and a press member of the lifting device of FIG. 5.

FIG. 8 is a diagram showing the pulley guide member and the press member of the lifting device of FIG. 5.

For example, describing with reference to FIG. 8, the pulley guide member 340 may be formed in the shape of a disc having a groove, and installed near the groove formed in the lifting pulley 320 to guide the rope which will be wound on the lifting pulley 320.

The press member 350 may perform a function of pressing the rope to stably keep the rope wound on the lifting pulley 320 in the wound state.

For example, describing with reference to FIG. 8, the press member 350 may be formed in the shape of a roller to press the rope wound on the groove formed in the lifting pulley 320.

Meanwhile, the lifting device 300 may be configured to be attached/detached to/from the body 100.

Figure 9:
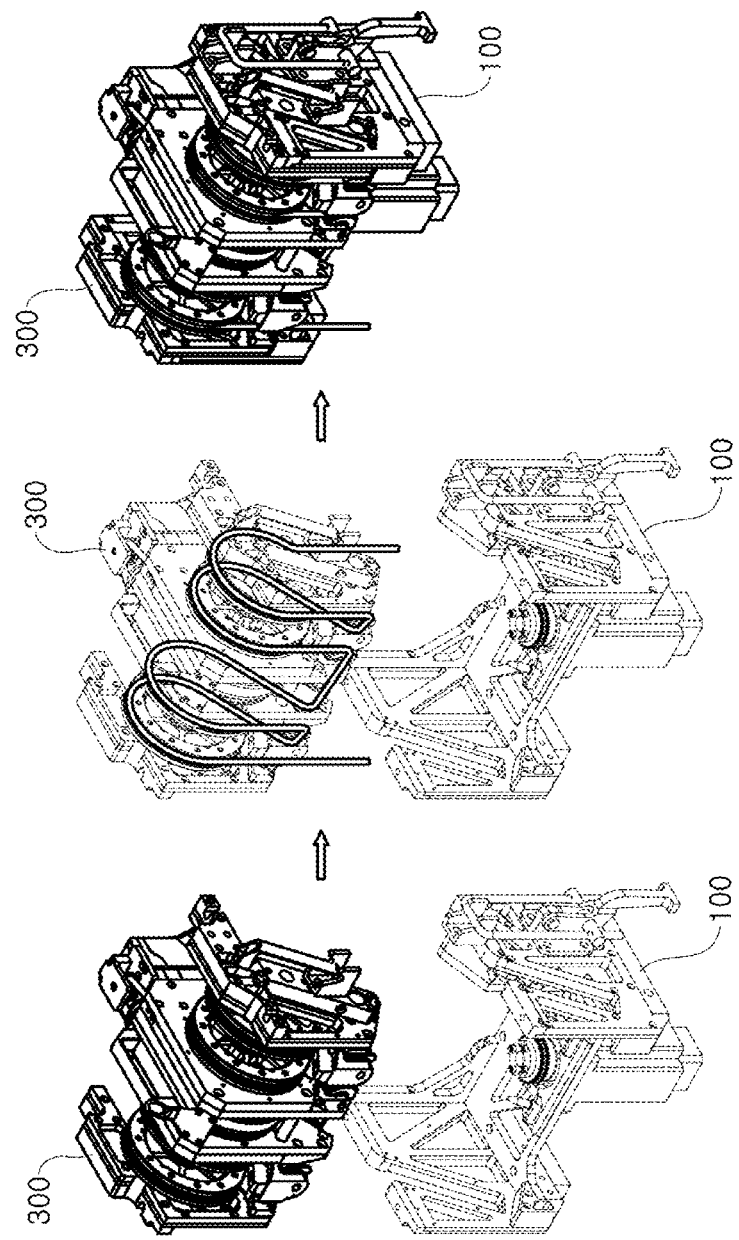
FIG. 9 is a diagram showing the lifting device of FIG. 5 that is attached/detached to/from the body.

FIG. 9 is a diagram showing the lifting device of FIG. 5 that is attached/detached to/from the body.

Specifically, describing with reference to FIG. 9, the lifting device 300 may be configured to be attached/detached to/from the body 100. When the lifting device 300 is detached from the body 100, the rope may be easily wound on the lifting pulley 320, and the lifting device 300 on which the rope is wound may be attached to the body 100.

Figure 10:
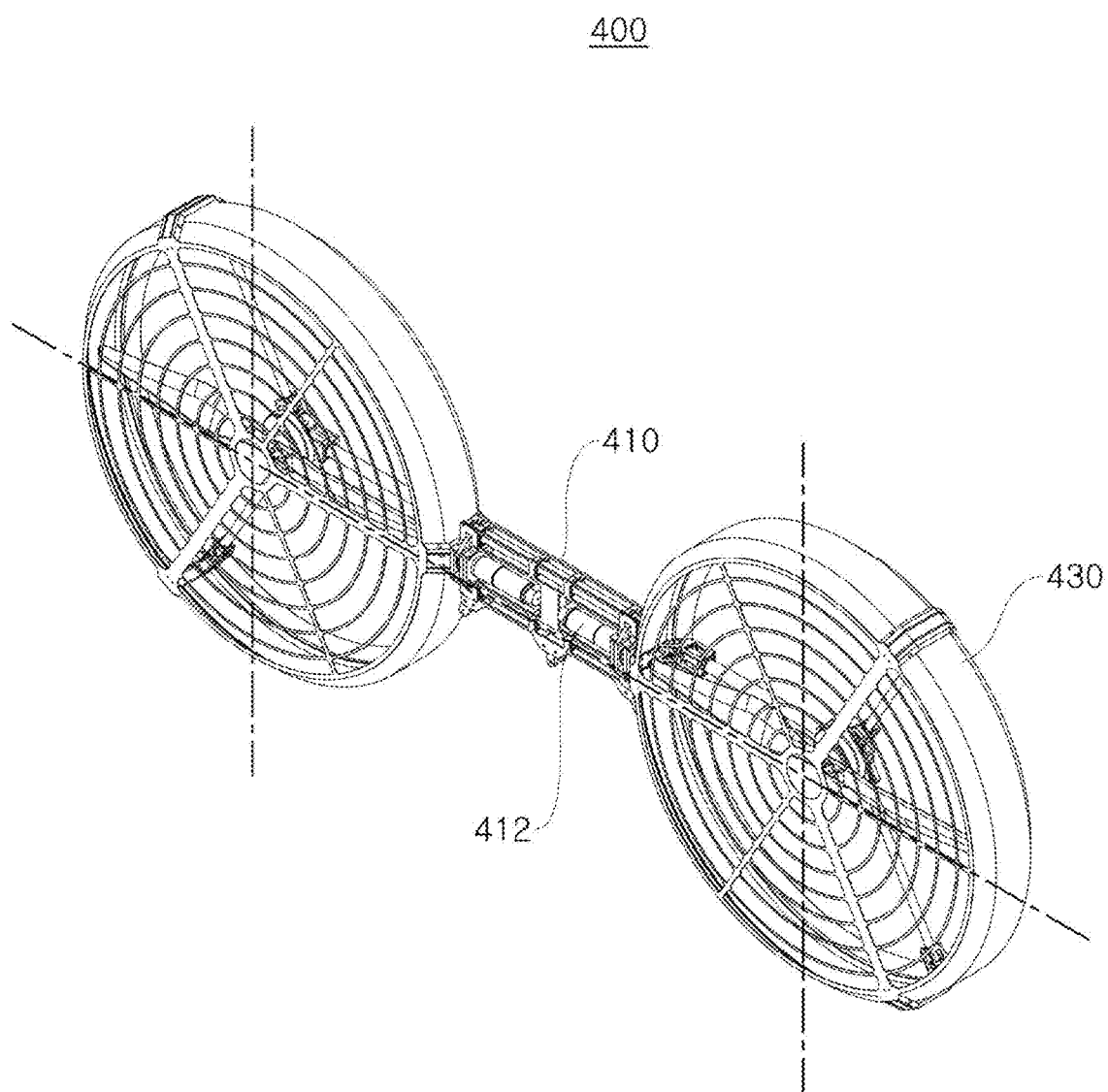
FIG. 10 is a diagram showing a steering device of the climbing robot platform of FIG. 1.

FIG. 10 is a diagram showing the steering device of the climbing robot platform of FIG. 1.

Subsequently, the configuration of the steering device 400 will be described.

The steering device 400 may be configured to control the movement of the climbing robot platform 1 using a propulsive force, and may include a tilting device 410 and a propulsion device 430 as shown in FIG. 10.

The tilting device 410 may include a tilting motor 412 to tilt the propulsion device 430 coupled to two sides.

A pair of propulsion devices 430 may be provided and configured to generate a propulsive force, and may include a propeller 432, a cover 434 and a rudder 436.

Figure 11:
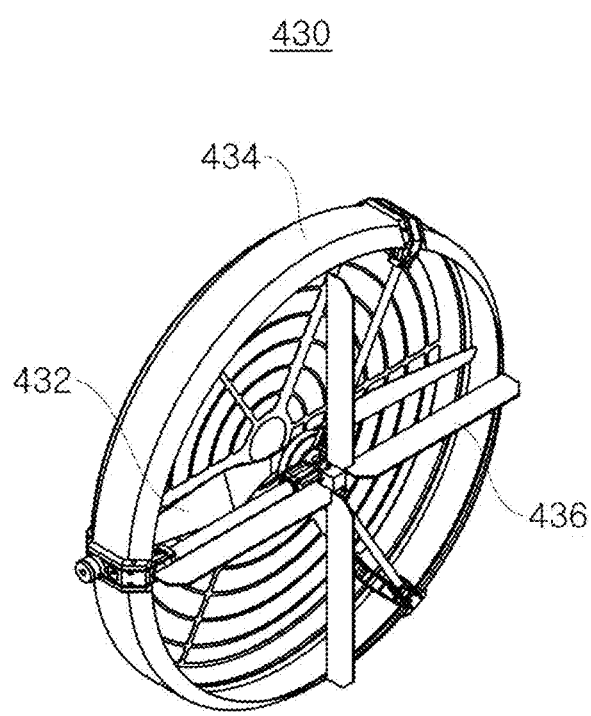
FIG. 11 is a diagram showing a propulsion device of the steering device of FIG. 10.

FIG. 11 is a diagram showing the propulsion device of the steering device of FIG. 10.

Specifically, describing with reference to FIG. 11, the propulsion device 430 may include the propeller 432 to generate a propulsive force by rotation, the cover 434 at which the propeller 432 is rotatably installed and having a hole through which air flows, and the rudder 436 to adjust the flow direction of air blown by the propeller 432.

When the propulsion device 430 is tilted by the tilting device 410 or the flow direction of air blown by the propulsion device 430 is adjusted by the rudder 436, the steering device 400 may control the movement of the climbing robot platform 1.

Figure 12:
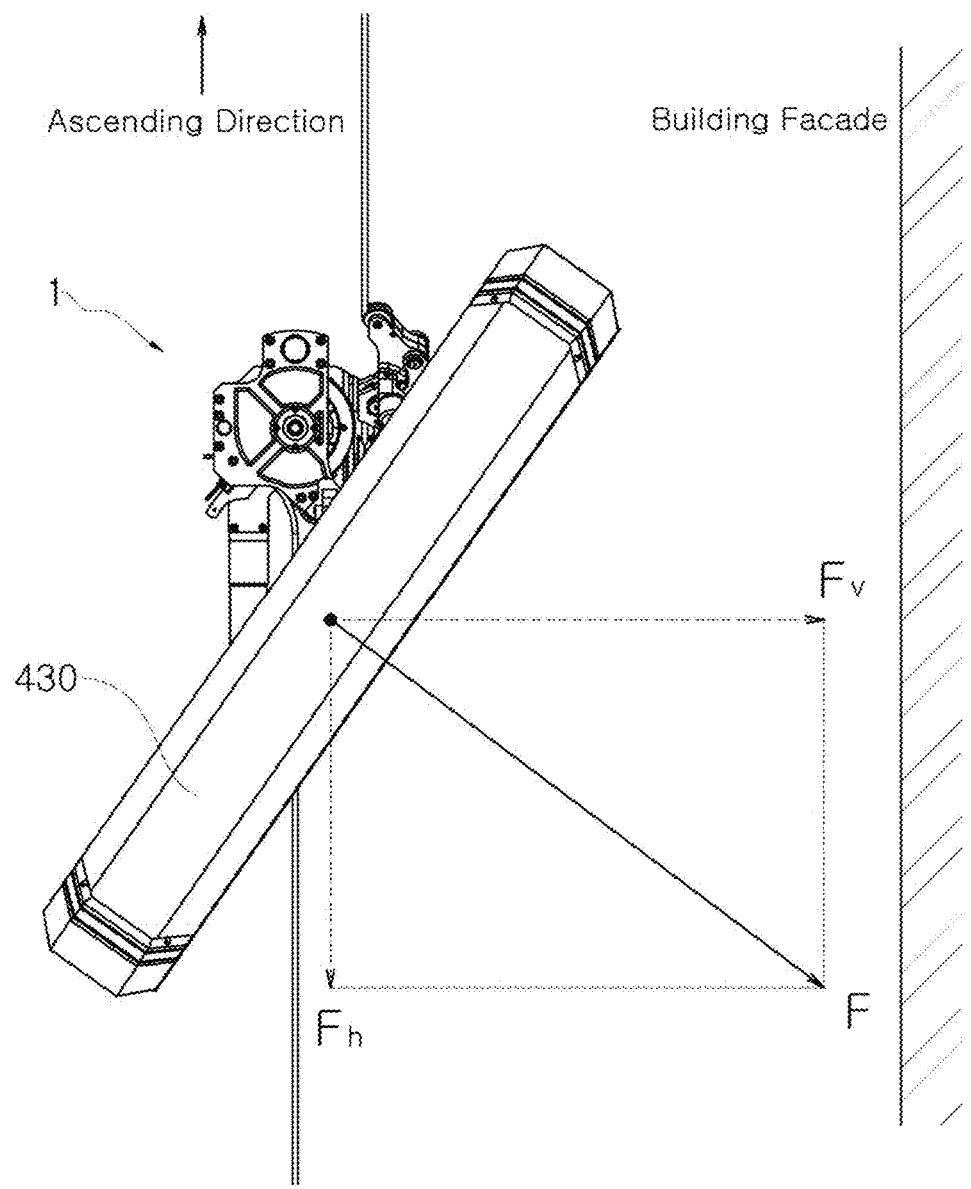
FIG. 12 is a diagram showing a horizontal force and a vertical force by a propulsive force of the steering device of FIG. 10.

FIG. 12 is a diagram showing a horizontal force and a vertical force by the propulsive force of the steering device of FIG. 10.

As shown in FIG. 12, the propulsive force F generated by the propulsion device 430 may be expressed as the sum of the horizontal force Fh and the vertical force Fv. In this instance, the climbing robot platform 1 may move away from the building facade by the horizontal force Fh, and may be pushed up by the vertical force Fv.

Figure 13:
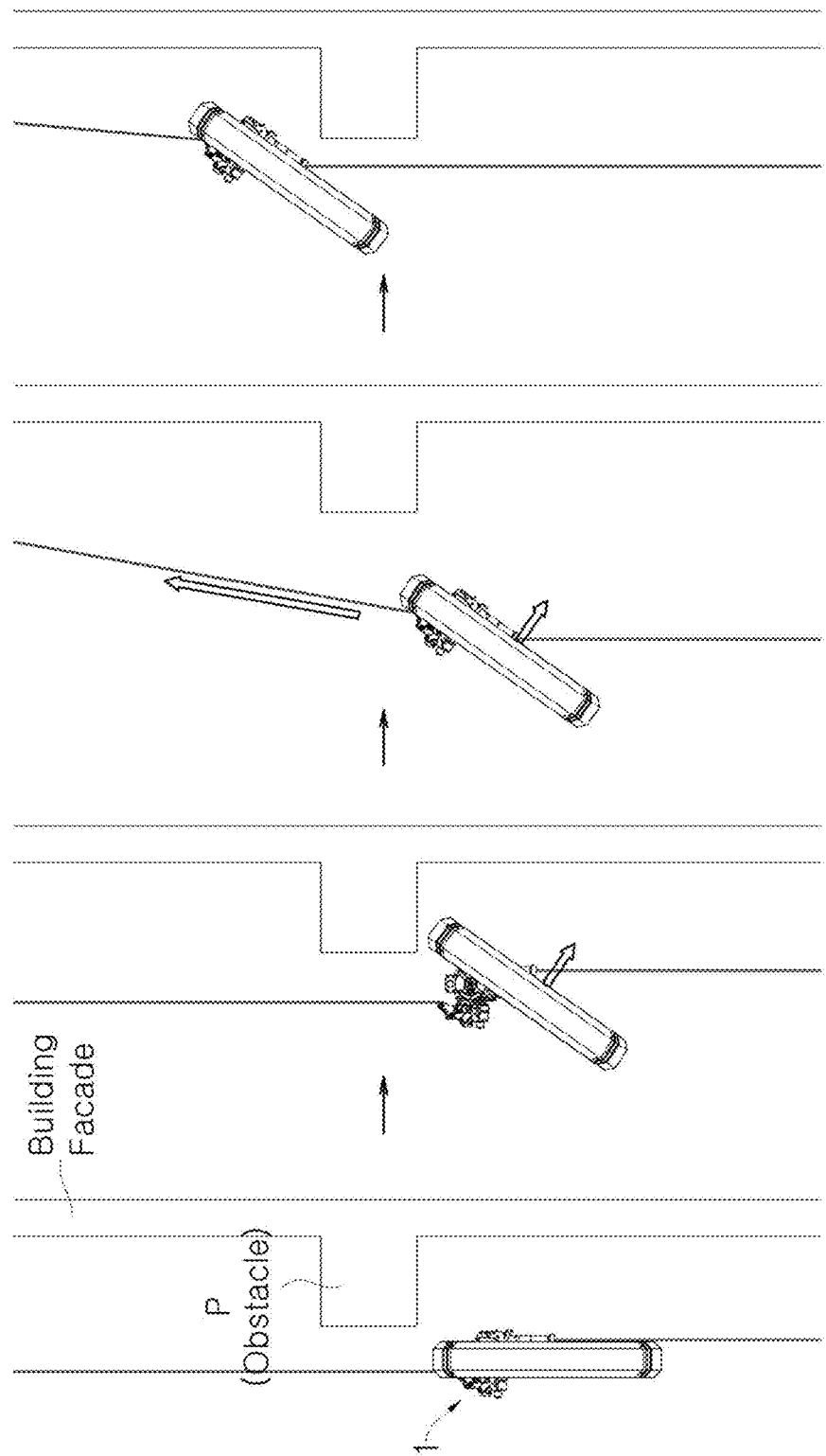
FIG. 13 is a diagram showing the operation of a climbing robot platform that goes over an obstacle using the steering device of FIG. 10.

FIG. 13 is a diagram showing the operation of the climbing robot platform that goes over an obstacle using the steering device of FIG. 10.

As shown in FIG. 13, when the climbing robot platform 1 moves up along the building facade and encounters the obstacle P, the tilting device 410 tilts the propulsion device 430 so that the propulsive force generated by the propulsion device 430 is directed toward the building facade. The climbing robot platform 1 may move away from the building facade and ascend beyond the obstacle by the propulsive force generated by the tilted propulsion device 430.

Figure 14:
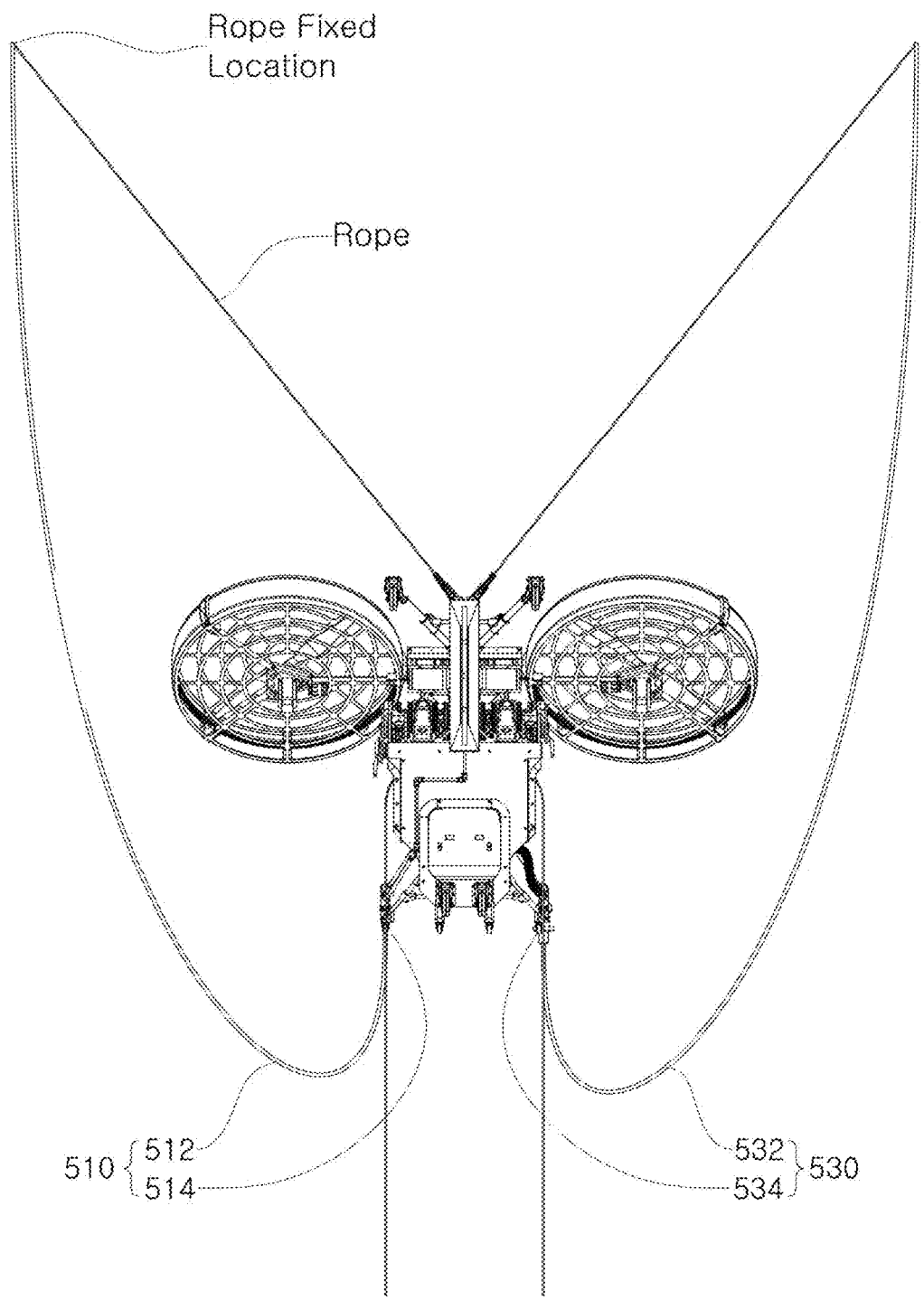
FIG. 14 is a diagram showing a supply device of the climbing robot platform of FIG. 1.

FIG. 14 is a diagram showing the supply device of the climbing robot platform of FIG. 1.

Subsequently, the configuration of the supply device 500 will be described.

The supply device 500 may include a power supply unit 510 to supply power and a water supply unit 530 to supply water.

The power supply unit 510 may include a power cable 512 connected to one rear side of the body 100 on the basis of the ascending direction of the cleaning robot, and a first rotatable connecting means 514 connecting the power cable 512 to the body 100.

The power cable 512 may be an existing cable for supplying power for the operation of the climbing robot platform 1, and may be configured to connect the upper part of the building from which the power is supplied to the body 100.

The first rotatable connecting means 514 may be an existing rotatable connecting means including a rotation axis and a rotation pin to prevent tangles in the power cable 512 connected to the body 100.

The water supply unit 530 may include a water cable 532 connected to one rear side of the body 100 on the basis of the ascending direction of the cleaning robot, and a second rotatable connecting means 534 connecting the water cable 532 to the body 100.

The water cable 532 may be an existing cable used to supply water necessary for cleaning the building facade using the cleaning module mounted in the climbing robot platform 1, and may be configured to connect the upper part of the building from which water is supplied to the body 100.

The second rotatable connecting means 534 may be an existing rotatable connecting means including a rotation axis and a rotation pin to prevent tangles in the water cable 532 connected to the body 100.

Subsequently, the configuration of the auxiliary power supply device will be described.

The auxiliary power supply device may be an existing battery capable of charging and supplying power, provided in the body 100. The auxiliary power supply device may use a part of the power supplied by the power supply unit 510 to charge, and may operate the climbing robot platform 1 using the charged power in case of emergency, for example, when the power supply to the climbing robot platform 1 is stopped.

Describing by taking an example, when the climbing robot platform 1 includes an alternating current (AC) motor and a direct current (DC) motor, the AC motor may be driven by the external power to put the climbing robot platform 1 into operation. Additionally, when the external power is interrupted, the DC motor may be driven using the auxiliary power supply device to put the climbing robot platform 1 into operation.

Hereinafter, the operation and effect of the climbing robot platform 1 according to an embodiment of the present disclosure will be described.

The cleaning module is attached to the climbing robot platform 1, and the rope from the upper part of the building is mounted. First, the opening/closing member 240 of the feeding device 200 is opened to let the rope in, and the fed rope is mounted in the lifting device 300.

In this instance, since the lifting device 300 is attachable/detachable to/from the body 100, the lifting device 300 may be detached from the body 100 to easily wind the rope on the lifting pulley 320.

The power cable 512 and the water cable 532 are connected on the rear side in the ascending direction of the climbing robot platform 1 having the rope mounted thereon to supply power and water to the climbing robot platform 1. The building facade cleaning work may be performed while the climbing robot platform 1 having the rope, the power cable 512 and the water cable 532 mounted thereon moves up and down along the building facade by a rope winding or unwinding motion of the lifting pulley 320.

When the cleaning module is not in contact with the building facade during the building facade cleaning work using the climbing robot platform 1, the location of the feed point may be adjusted by the location adjusting member 230 of the feeding device 200 to bring the cleaning module into close contact with the building facade.

Additionally, when the climbing robot platform 1 moves up along the building facade and encounters an obstacle, the propulsion device 430 of the steering device 400 may be adjusted to control the climbing robot platform 1 to go over the obstacle.

Meanwhile, the climbing robot platform 1 includes two lifting devices 300 to wind or unwind two ropes to move up the cleaning robot. Additionally, since the plurality of lifting pulleys 320 on which the rope is wound, provided in the lifting device 300, is connected with the differential gear device 330, each lifting pulley 320 winds the rope with the equal force to minimize the abrasion of the rope.

Additionally, when the power supply to the climbing robot platform 1 is stopped during the building facade cleaning work, the climbing robot platform 1 may be put into operation and placed back using the charged power in the auxiliary power supply device.

As described above, in the climbing robot platform of the present disclosure, the feeding device adjusts the location of the rope feed point, leading to a change in the relative position of the center of mass and the point of action of tension of the cleaning robot by the feeding device and the consequential movement of the climbing robot platform, in order to bring the cleaning module into contact with the building facade in parallel to the building facade.

Additionally, since the feeding device includes the opening/closing member at the rope feed point and the lifting device is attachable/detachable to/from the body, it is possible to easily attach the rope to the climbing robot platform.

Additionally, since the movement of the climbing robot platform is controlled through the propulsion device which generates a propulsive force, the climbing robot platform may easily go over an obstacle.

Additionally, since the plurality of lifting pulleys is connected with the differential gear device, the equal force is transmitted to the lifting pulleys, thereby preventing damage to the rope wound on the lifting pulleys.

Additionally, with the auxiliary power supply device including the battery capable of charging and supplying power, it is possible to safely place the cleaning robot back using the power of the auxiliary power supply device when the power supply is stopped.

While the present disclosure has been hereinabove described in detail through the representative embodiments, those having ordinary skill in the technical field pertaining to the present disclosure will understand that a variety of modifications may be made to these embodiments without departing from the scope of the present disclosure. Therefore, the scope of protection of the present disclosure should not be limited to the disclosed embodiments, and should be defined by all modifications or changes derived from the appended claims and their equivalent scope.

| Detailed Description of Main Elements | |
|---|---|
| 1: Climbing robot platform | 100: Body |
| 200: Feeding device | 210: First guide member |
| 220: Second guide member | 230: Location adjusting member |
| 240: Opening/closing member | 250: Location measuring device |
| 300: Lifting device | 305: Frame |
| 310: Rotary rod | 320: Lifting pulley |
| 330: Differential gear device | 340: Pulley guide member |
| 350: Press member | 400: Steering device |
| 410: Tilting device | 430: Propulsion device |
| 500: Supply device | 510: Power supply unit |
| 530: Water supply unit | |

What is claimed is:

1. A climbing robot platform of a building facade cleaning robot, comprising:
   a body;
   a lifting device installed in the body, moving up by winding a rope and moving down by unwinding the rope; and
   a feeding device installed in the body to feed the rope by adjusting a feed point of the rope,
   wherein the feeding device includes:
   a first guide member to feed the rope;
   a second guide member rotatably connected to the first guide member to guide the rope;
   a location adjusting member rotatably connected to each of the first guide member and the second guide member and capable of adjusting a length; and
   an opening/closing member to open/close the feed point, and
   wherein the first guide member includes a first roller at the feed point,
   the opening/closing member includes a third roller rotatably coupled to the first guide member, and
   when the opening/closing member closes the feed point, the rope is pressed by the first roller and the third roller.

2. The climbing robot platform according to claim 1, further comprising:
   a tilting device installed in the body and capable of tilting; and
   a propulsion device installed in the tilting device to be tilted, and including a propeller to generate a propulsive force.

3. The climbing robot platform according to claim 2, wherein the lifting device includes at least two lifting pulleys to wind or unwind the rope by a torque of a lift motor, and
   each lifting pulley is connected with a differential gear device which distributes the torque transmitted from the lift motor.

4. The climbing robot platform according to claim 3, wherein the lifting device is detachable from the body.

5. The climbing robot platform according to claim 4, further comprising a pulley guide member to guide movement of the rope wound on the lifting pulleys and a press member to press the rope wound on the lifting pulleys.

6. The climbing robot platform according to claim 5, further comprising a location measuring device to measure a location of the body.

7. The climbing robot platform according to claim 6, further comprising an auxiliary power supply device including a battery capable of charging and supplying power.

8. A climbing robot platform of a building facade cleaning robot, comprising:
   a body;
   a lifting device installed in the body, moving up by winding a rope and moving down by unwinding the rope;
   a feeding device installed in the body to feed the rope by adjusting a feed point of the rope; and
   a supply device including a power supply unit to supply power and a water supply unit to supply water,
   wherein the feeding device includes:
   a first guide member to feed the rope;
   a second guide member rotatably connected to the first guide member to guide the rope;
   a location adjusting member rotatably connected to each of the first guide member and the second guide member and capable of adjusting a length; and
   an opening/closing member to open/close the feed point, and
   wherein the first guide member includes a first roller at the feed point,
   the opening/closing member includes a third roller rotatably coupled to the first guide member, and
   when the opening/closing member closes the feed point, the rope is pressed by the first roller and the third roller.

9. The climbing robot platform according to claim 8, wherein the power supply unit includes a power cable rotatably connected to a rear side of the body on the basis of an ascending direction of the cleaning robot, and
   the water supply unit includes a water cable rotatably connected to the rear side of the body on the basis of the ascending direction of the cleaning robot.

10. The climbing robot platform according to claim 9, further comprising a tilting device installed in the body and capable of tilting; and
    a propulsion device installed in the tilting device to be tilted, and including a propeller to generate a propulsive force.

11. The climbing robot platform according to claim 10, further comprising a location measuring device to measure a location of the body.

12. The climbing robot platform according to claim 11, further comprising an auxiliary power supply device including a battery capable of charging and supplying power.

* * * * *

UNITED STATES PATENT AND TRADEMARK OFFICE
CERTIFICATE OF CORRECTION

PATENT NO. : 12,194,511 B2  
APPLICATION NO. : 17/389129  
DATED : January 14, 2025  
INVENTOR(S) : Jongwon Kim et al.

Page 1 of 1

It is certified that error appears in the above-identified patent and that said Letters Patent is hereby corrected as shown below:

On the Title Page

In Column 1, item (73), in Assignees, Line 1, delete "R&D8" and insert --R&DB-- therefor.

Signed and Sealed this
Eighteenth Day of March, 2025

Coke Morgan Stewart
*Acting Director of the United States Patent and Trademark Office*